United States Patent [19]

Bertram et al.

[11] Patent Number: 5,215,226
[45] Date of Patent: Jun. 1, 1993

[54] CLAMPING SYSTEM FOR FLUID INJECTION DEVICES

[75] Inventors: George Bertram, Newton, Conn.; Michael Ruscitti, Washingtonville, N.Y.; Andrew Tyler, Southbury; John Corrigan, Washington, both of Conn.

[73] Assignee: Sealed Air Corporation, Saddle Brook, N.J.

[21] Appl. No.: 871,331

[22] Filed: Apr. 21, 1992

[51] Int. Cl.⁵ .................................................. B67D 5/56
[52] U.S. Cl. ..................................... 222/135; 222/145; 239/600
[58] Field of Search ............... 222/135, 145, 153, 325; 239/600, 413, 414

[56] References Cited

U.S. PATENT DOCUMENTS

| | | | |
|---|---|---|---|
| 3,687,370 | 8/1972 | Sperry | 239/112 |
| 3,945,569 | 3/1976 | Sperry | 239/112 |
| 4,023,733 | 5/1977 | Sperry | 239/112 |
| 4,159,079 | 6/1979 | Phillips, Jr. | 239/112 |
| 4,426,023 | 1/1984 | Sperry et al. | 222/132 |
| 4,469,251 | 9/1984 | Sperry et al. | 222/135 |
| 4,568,003 | 2/1986 | Sperry et al. | 222/145 |
| 4,674,268 | 6/1987 | Gavronsky et al. | 53/468 |
| 4,800,708 | 1/1989 | Sperry | 53/449 |
| 4,854,109 | 8/1989 | Pinarer et al. | 53/397 |
| 4,867,346 | 9/1989 | Faye et al. | 222/145 |
| 4,898,327 | 2/1990 | Sperry et al. | 239/1 |
| 4,993,596 | 2/1991 | Brown | 222/145 |

*Primary Examiner*—Sherman Basinger
*Attorney, Agent, or Firm*—Bell, Seltzer, Park & Gibson

[57] ABSTRACT

A clamping system for a fluid injection gun and cartridge such as the type in which fluid foam precursors are fed to the cartridge to be mixed and distributed to make custom foam packaging. The clamping system comprises a valve that defines respective opened and closed positions, a clamp seat adjacent the valve for receiving an injection cartridge therein, a clamp lid engagable against the seat and movable between respective open and closed positions, a finger on the valve for preventing the clamp lid from being opened while the valve is open to thereby prevent the clamp lid from being opened when fluid is flowing through the valve, and a shoulder on the clamp lid for preventing the valve from being opened when the clamp lid is opened to thereby prevent the flow of fluid when the lid is open.

23 Claims, 3 Drawing Sheets

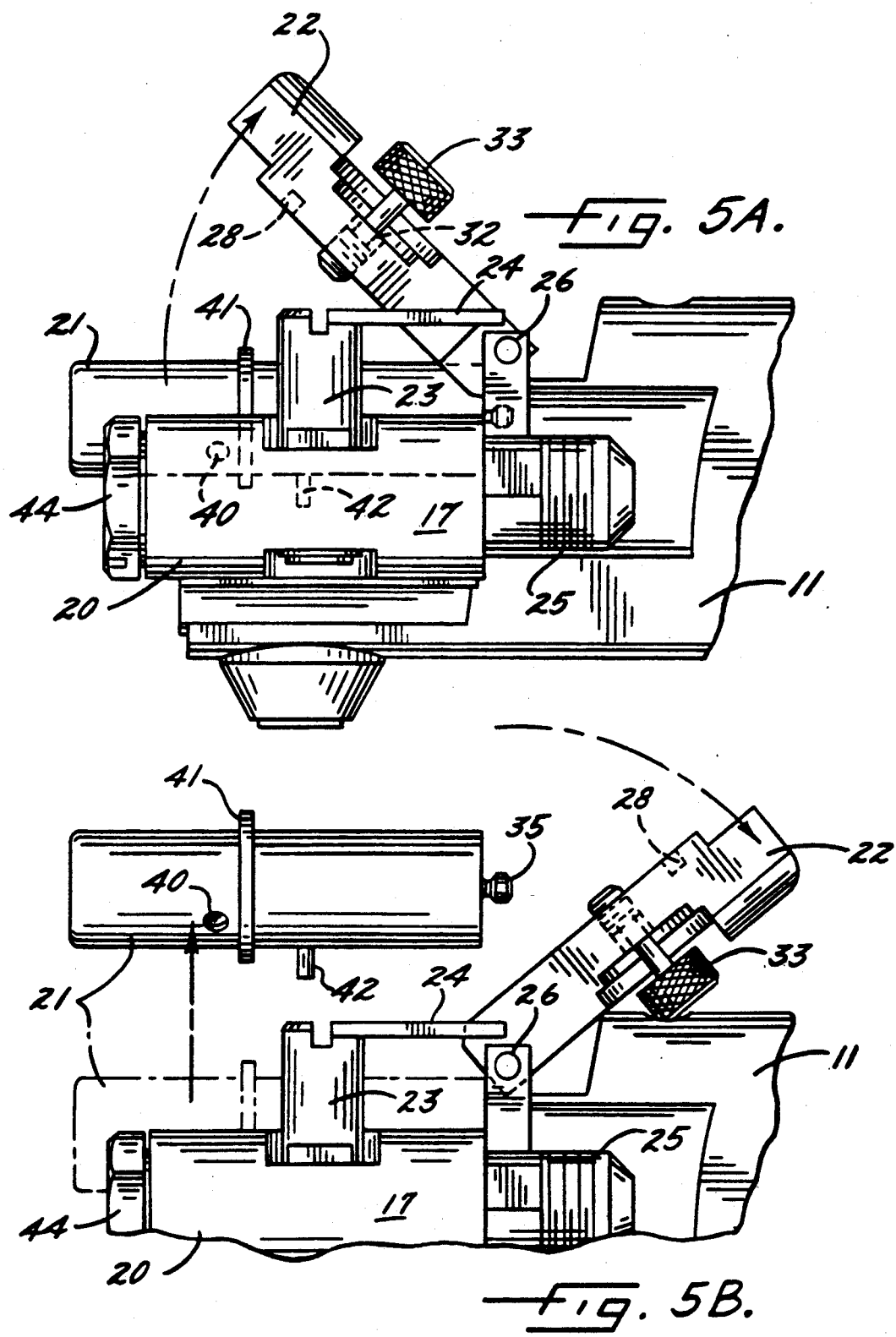

CLAMPING SYSTEM FOR FLUID INJECTION DEVICES

FIELD OF THE INVENTION

The present invention relates to fluid injection devices, such as the type in which one or more fluid foam precursors are fed to a cartridge to be mixed and distributed to make custom foam packaging, and in particular relates to a clamping system for the injection cartridge portion of such devices.

BACKGROUND OF THE INVENTION

The present invention relates to the use of foamable compositions for packaging purposes. In a number of packaging applications, fragile articles or those otherwise needing protection from undesired movement or breakage, particularly items with irregular shapes and sizes, have been packed in protective foamed polymer packaging materials, such as injection molded styrofoam, styrofoam chips, or other similar materials.

One technique for packaging articles in foam comprises generating the foam in place while the articles are being packaged. For example, when certain chemicals are mixed, they form polymeric products while at the same time generating gases, such as carbon dioxide and water vapor. If such chemicals are selected as being those that harden relatively quickly, they can be used to form hardened polymer foams in which the foam is produced by the gaseous carbon dioxide and water vapor leaving the mixture as it hardens.

One technique for foam-in-place packaging is to place the object to be packaged in a container, cover it with a polymer film or other material which will protect it from liquids, inject a certain amount of foamable composition into the remainder of the container, and then close the container. As the composition foams, it fills the remainder of the container, forming a custom-shaped foam cushion surrounding the article.

For larger volume packaging operations, i.e., those requiring a number of foam protective packages to be made in relatively rapid succession, a number of automated devices have been developed and are assigned to the assignee of the present invention. Exemplary devices are described and claimed in U.S. Pat. Nos. 4,674,268; 4,800,708; and 4,854,109.

In other circumstances, however, the need for foam-in-place packaging still exists, but the use of automated machinery is unnecessary or undesired from a cost, efficiency, or other standpoint. In such circumstances, foam-in-place packaging can be accomplished with a supply of foamable chemicals, usually two, and an injection gun connected to the supplies of the respective chemicals. The chemicals are mixed within the gun to form the foamable composition. Examples of earlier versions of such guns include those described in U.S. Pat. Nos. 3,687,370; 3,945,569; 4,023,733; 4,159,079; and 4,426,023.

As known to those familiar with these devices and with foam-in-place resin systems, the resins tend to react quickly enough to often harden within, and then clog, the injection device. Thus, an improvement in such devices was the replacement of an integral mixing chamber in guns, such as those described in the aforementioned patents, with a detachable mixing chamber or cartridge, such as that shown in U.S. Pat. Nos. 4,469,251; 4,568,003; and 4,898,327. The contents of the U.S. Pat. No. 4,898,327 are incorporated entirely herein by reference and are assigned to the assignee of the present invention. Additionally, several applications for related improvements in the cartridge injection system are set forth in the following copending applications, each of which is likewise incorporated entirely herein by reference: Bertram et al, Ser. No. 07/730,708; filed Jul. 16, 1991 for "Improved Cartridge Port Design for Dispensing Foam Precursors; and Sperry et al, Ser. No. 07/767,033; filed Sep. 26, 1991 for "Improved Pumping and Cleaning System for Foam In Place Injection Cartridges. By providing a small, detachable injection cartridge, the problems of cleaning or replacing a clogged device are minimized.

As seen from each of these patents and applications, the cartridge is a generally cylindrical device, which in actual practice can vary in size, but in typical embodiments is approximately 2¾ inches in length and approximately ⅝ inch in diameter. In operation, the cartridge usually serves as the mixing chamber for two foam precursors, such as the typical combination of a liquid organic resin and a polyisocyanate, which react to form polyurethane, carbon dioxide, and water vapor. As set forth above, because water vapor and carbon dioxide are formed as gases, they tend to bubble out of the resulting polyurethane as it hardens, leaving behind a foamed structure.

As seen in the patents which relate to cartridge-type devices, the chemicals to be ejected are mixed and valved by adding the chemicals separately to the cartridge and then moving a valving rod laterally within the cartridge housing to open and close the cartridge. The forces applied to the cartridge during the valving operations are rather significant: up to 900 pounds when polyurethane has hardened on the end of the cartridge and adhered the valving rod to the face of the cartridge. This force is applied to the cartridge both laterally; i.e, in the direction of the valving rod's movement; and perpendicularly. To date, the detachable cartridges have been held in place in the gun systems describe in these patents by a single-threaded stud that depends from the barrel of the cartridge. This stud, although generally of relatively small size; i.e., approximately ⅛ inch in diameter and approximately ⅝ inch in length; was expected to successfully bear all of the lateral and perpendicular forces applied during foam injection.

It has been discovered, however, that the forces applied to such cartridges are significant enough to reduce their lifetime below that which should otherwise be expected, or to cause breakdown and leakage of the entire apparatus.

Therefore, there exists a need for a better structure and technique for fastening the detachable injection cartridge in place more securely with respect to the chemical supply and to the valving mechanism that operates it while still maintaining the advantages of the detachable injection cartridge.

OBJECT AND SUMMARY OF THE INVENTION

Therefore, it is an object of the present invention to provide an improved injection system in which the replaceable injection cartridge is maintained in the system in a manner that more properly and successfully withstands the various forces applied to it during the injection process.

The invention meets this object with a clamping system for a fluid injection gun and cartridge. The clamping system comprises a valve that defines respective opened and closed positions for controlling the flow of fluid to an injection cartridge, a clamp seat adjacent the valve for receiving an injection cartridge therein, a clamp lid engagable against the seat and moveable between respective open and closed positions for maintaining a cartridge in the seat when the clamp lid is closed and for allowing a cartridge to be removed or replaced when the clamp lid is open, means on the valve for preventing the clamp lid from being opened while the valve is open to thereby prevent the clamp lid from being opened when fluid is flowing through the valve, and means on the clamp lid for preventing the valve from being opened when the clamp lid is open to thereby prevent the flow of fluid when the lid is open.

The foregoing and other objects, advantages and features of the invention, and the manner in which the same are accomplished will become more readily apparent upon consideration of the following detailed description of the invention taken in conjunction with the accompanying drawings, which illustrate preferred and exemplary embodiments, and wherein:

BRIEF DESCRIPTION OF THE DRAWINGS

FIG. 5A is a side elevational view of the clamping system of the present invention and showing the clamp lid being opened;

FIG. 5B is another side elevational view of the clamping system of the invention illustrating the removable structure of the injection cartridge and the fully opened position of the clamped lid.

DETAILED DESCRIPTION

Figure 1:
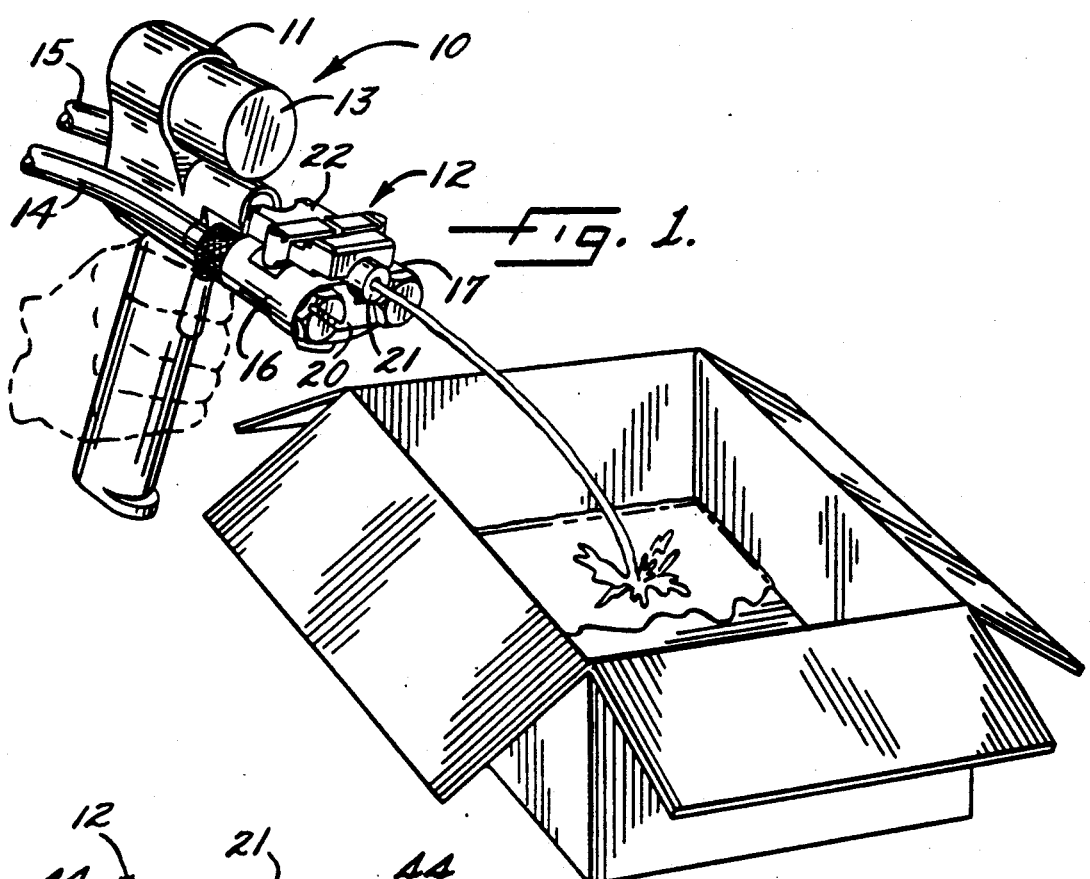
FIG. 1 is a perspective view of portions of an injection gun assembly of the type used to dispense foamable compositions.

The present invention is a fluid injection apparatus broadly designated at 10 in FIG. 1 in which one or more fluid foam precursors are fed to a gun and an injection cartridge to be mixed and distributed to make custom foam packaging. FIG. 1 illustrates that in typical embodiments, the apparatus includes a gun framework 11 which carries a clamping system broadly designated at 12 to be described in more detail herein, along with a motor 13, and a pair of hoses 14,15, which in preferred embodiments carry the separate chemicals, such as an organic resin and a isocyanate, respectively, that react to form polyurethane foam. In the embodiment illustrated in FIG. 1, the injection apparatus 10 is shown as the hand-held type, but it will be understood that the clamping system 12, to be described herein, can be used in conjunction with more fixed devices, such as the automatic foam packaging devices set forth in U.S. Pat. Nos. 4,800,708 and 4,854,109.

The clamping system of the present invention comprises a valve 16 and, in preferred embodiments a pair of valves 16,17, that define respective open and closed positions for controlling the flow of fluid to an injection cartridge. A clamp seat 20 is adjacent the valve 16,17 for receiving an injection cartridge 21 therein. A clamp lid 22 is engagable against the clamp seat 20 and is movable between respective open and closed positions (e.g., FIGS. 4, 5A and 5B) for maintaining the cartridge 21 in the seat 20 when the clamp lid 22 is closed and for allowing the cartridge 21 to be removed or replaced when the clamp lid 22 is open.

The valves 16,17 include means for preventing the clamp lid 22 from being open while the valves 16,17 are open to thereby prevent the clamp lid 22 from being open when fluid is flowing through the valve. More particularly, in preferred embodiments, the valves 16,17 are mounted in the clamp seat 20. Each valve comprises a rotating valve stem 23 (FIGS. 4, 5A and 5B) for being rotated to open and close the valve 16,17. The clamp lid opening prevention means comprises a finger 24 on each valve stem that covers the clamp lid 22 when the lid 22 is closed (FIG. 2) and the valves 16,17 are open, so that the lid 22 cannot be opened until the valves 16,17 are closed.

In typical embodiments, most of the operative parts described herein are formed of metals, but it will be understood that other appropriate structural materials can be utilized.

In preferred embodiments, the opened and closed positions of the valves 16,17 are defined by rotating the valve stems 23 ninety degrees (90°). As illustrated in the drawings, in the preferred embodiments, the valves 16,17 are closed when the fingers 24 are rotated to a position generally parallel with the valves and their threaded hose connections 25 (e.g., the position of valve 17 in FIG. 3), and are open when the fingers 24 are generally perpendicular to the threaded hose connections (FIG. 2).

The invention further comprises means shown as the shoulder 29 (FIG. 6) on the clamp lid 22 for preventing the valves 16,17 from being opened when the clamp lid 22 is open to thereby prevent the flow of fluid when the lid 22 is open. As illustrated in the drawings, in the preferred embodiments the valve opening prevention means comprises means on the clamp lid 22 positioned in the path of rotation of the valve stem fingers 24 when the lid is open for blocking rotation of the fingers 24 and of the valve 16,17 to thereby prevent the valve 16,17 from being rotated open when the lid 22 is open.

In this regard, in preferred embodiments the clamp lid 22 is hinged to the clamp seat 20. As perhaps best shown in FIGS. 5A and 5B, a pair of hinges 26 join the clamp seat 20 and the clamp lid 22 and are positioned adjacent rearward portions of the seat 20, the lid 22 and the cartridge 21. As described earlier, each of the valve stem fingers 24 is rotatable toward these rearward portions to close the valves 16,17. In the preferred embodiments, each of the fingers 24 has a length such that its radius of rotation brings it into contact with the lid 22 at a point adjacent the hinges 26 when the lid is open to thereby prevent the fingers 24 from being rotated when the lid is open to correspondingly prevent the valves 16,17 from being opened and fluid from flowing when the lid 22 is open.

Figure 2:
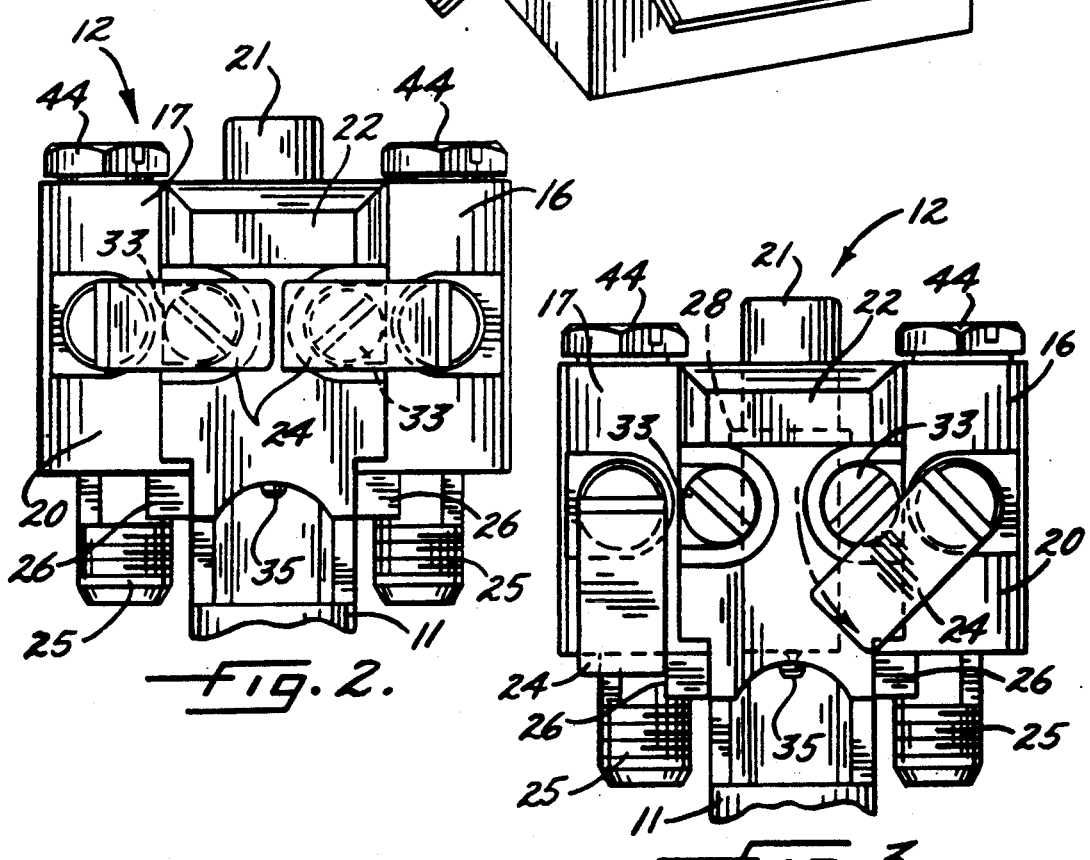
FIG. 2 is a top plan view of the clamping system of the present invention illustrating the valves in their open position.
Figure 3:
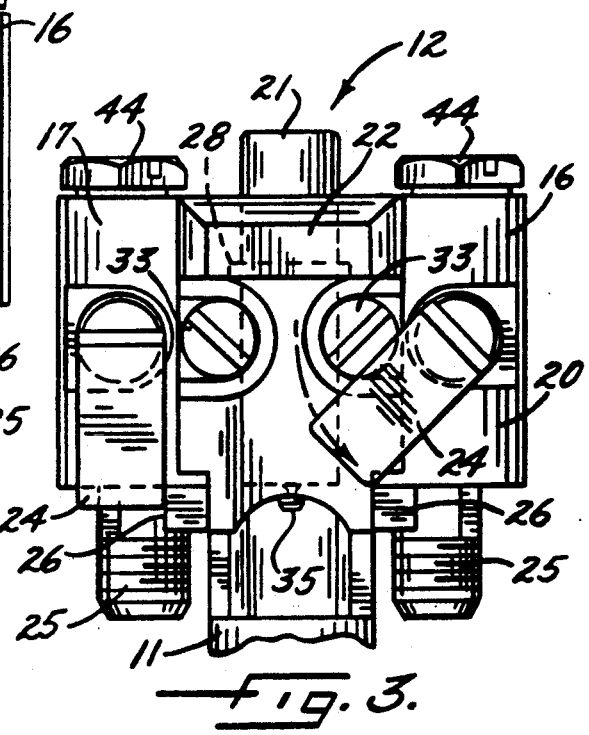
FIG. 3 is another top plan view corresponding to FIG. 2, but showing one valve in its closed position and the other valve being closed.
Figure 6:
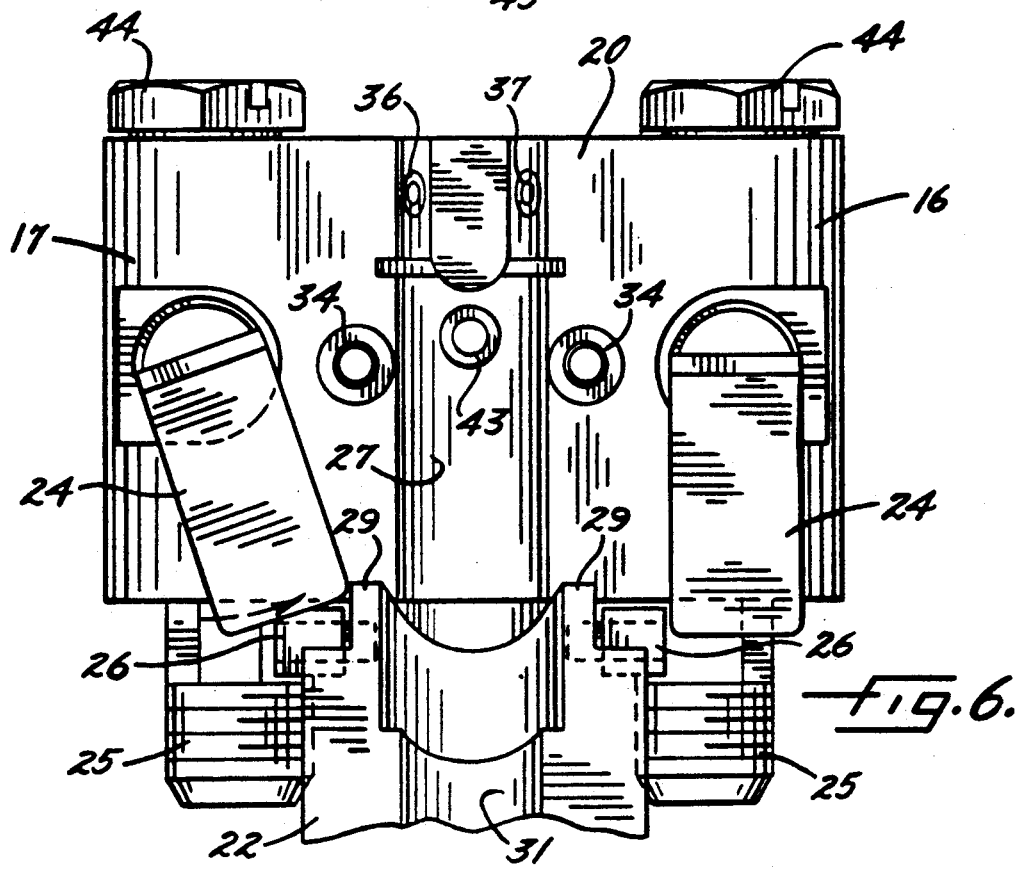
FIG. 6 is a top plan view of the clamping system of the present invention in the opened position.

These safety features are also illustrated in the sequence of FIGS. 2, 3, and 6. FIG. 2 illustrates the clamping system 12 of the present invention with the lid 22 engaged against the seat 20 with the cartridge 21 there between. The valves 16,17 are open as indicated by the perpendicular position of the valve stem fingers 24. It will thus be seen that the lid 22 cannot be raised until the fingers are moved out of the way. In order to move the fingers out of the way, however, they must be rotated rearwardly, which shuts off the valves 16,17. Thus, as a first safety feature, the lid 22 cannot be opened until the valves 16,17 are closed.

When the lid is open, however, it provides an additional safety feature, best illustrated in FIG. 6. As shown therein, the lid 22 is in the open position and the valves are 16,17 in their closed position. The finger 24 on valve 17 is illustrated as having been partially rotated towards its open position. It will be seen, however, that the radius of the finger 24 and the position of the hinges 26 and, therefore, of the clamp lid 22, are such that the clamp lid 22 prevents any further rotation of the fingers 24 and correspondingly prevents the valves 16,17 from being opened. Thus, the valves 16,17 cannot be opened until the clamp lid 22 is returned to its engagement against the seat 20.

In other words, the clamp lid 22 is hinged in the path of rotation of the valve stem fingers 24 when the lid is open for blocking rotation of the fingers 24 and of the valves 16,17 to thereby prevent the valves from being rotated open when the lid is open.

FIG. 6 also illustrates that in preferred embodiments, the clamp seat 20 further comprises a longitudinally positioned semi-cylindrical channel 27 for receiving the preferably cylindrical cartridge 21 therein. It will be understood that the cylindrical cartridge shape is the present preferred embodiment but that other shapes for both the cartridge and the channel 27 could be incorporated in the clamping system of the present invention. The clamp seat 20 further comprises a groove 30 therein that is perpendicular to the semi-cylindrical channel for receiving a clip ring or equivalent structure that can be positioned around an injection cartridge to provide lateral support to the cartridge 21 in the clamping system 12 when lateral forces are applied against the cartridge 21.

The clamp lid 22 also has a longitudinally positioned semi-cylindrical channel 31 therein that corresponds to the channel 27 in the clamp seat 20 for defining a longitudinal cylindrical opening between the seat 20 and the lid 22 for clamping a cylindrical cartridge 21 therein. The lid 22 further comprises a groove 28 therein perpendicular to the semi-cylindrical channel for receiving a clip ring that is positioned around an injection cartridge to complement and provide additional lateral support to a cartridge in the clamping system when lateral forces are applied against the cartridge.

It will thus be seen from the drawings that in the preferred embodiment the valves 16,17 are mounted in he clamp seat 20 on opposite sides of the semi-cylindrical channel 27.

Figure 4:
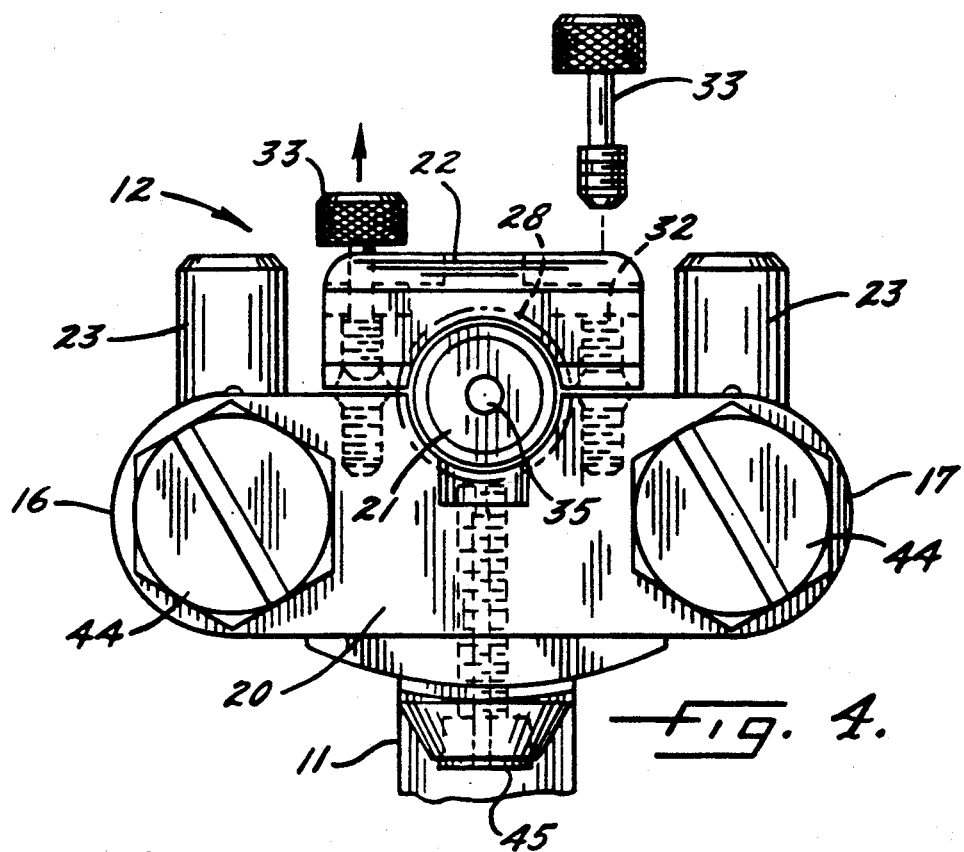
FIG. 4 is a front elevational view of the clamping system of the present invention.

In preferred embodiments of the invention, the clamping system 12 further comprises means for releasably securing the lid 22 in its closed position in engagement with the seat 20. These means are shown as a pair of openings 32 in the lid 22 on opposite sides of the semi-cylindrical channel 31 for receiving a pair of clamping bolts 33 therethrough. The seat 20 further comprises a pair of threaded openings 34 therein corresponding to the openings 32 in the lid 22 for threadedly receiving the clamping bolts 33. As further illustrated in FIGS. 5A and 5B, in preferred embodiments, the openings 32 in the lid 22 are likewise threaded for keeping the bolts in the lid if desired, although as illustrated by FIG. 4, the bolts 33 can also be removed entirely.

Furthermore, in the illustrated embodiments, the fingers 24 also block access to the bolts 33 when the valves 16,17 are open, thus preventing their removal and providing an additional safety feature.

Other details of the invention are shown in the accompanying drawings. For example, the cartridge 21 is typically of those described in the aforementioned patents and pending applications. The cartridge 21 includes a valving rod 35 illustrated in FIGS. 2, 3, 5A and 5B. In operation, the motor 13 drives a series of gears (not shown) Which, in turn, drives a ball screw (not shown) which is connected to the valving rod 35. As the valving rod 35 is reciprocated laterally, it permits foam precursors to be mixed and injected from it.

In this regard, the clamp seat 20 further comprises respective fluid flow passages 36,37 which are positioned so that when the cartridge 21 is in place the openings 36,37 align with the corresponding entry ports, one of which is shown at 40, in FIG. 5B. In preferred embodiments, the openings 36,37 terminate with O-rings formed of an appropriate material and the clamping system urges the cartridge 21 against these O-rings to form an improved seal between the openings and the cartridge.

FIGS. 5A and 5B also illustrate the clip ring 41 referred to earlier, with respect to the grooves already described.

The cartridge 21 also includes a small depending stud 42 which drops into an opening 43 in the seat 20. The stud serves to properly align the cartridge with respect to the entire clamping assembly 12 and particularly with respect to the fluid flow openings 36,37 and the forward and rearward position of the valving rod 35. Absent the stud 42, properly aligning the openings 36,37 with the entry port 40 in the cartridge 21 would be extremely difficult. As stated earlier, however, one of the advantages of the present invention is that the stud 42 no longer has to bear the lateral forces applied to the cartridge 21 during injection.

The drawings illustrate a few additional details. The valves 16,17 are held in place by bolts 44. The entire clamping assembly 12 is held to the gun framework 11 by a threaded bolt 45 so that the entire clamping assembly can be removed from the gun framework, or in preferred embodiments, prior art clamping systems can be replaced and retrofitted with the clamping system of the prevent invention using the same gun framework. As illustrated in FIG. 4, the bolt 45 is hollow and corresponds to the opening 43 in the seat 20 for receiving the depending stud 42 on the cartridge 21 therein. FIG. 4 also shows the face of the cartridge 21 and the opposite end of the valving rod 35.

In the drawings and specification, there have been disclosed typical preferred embodiments of the invention and, although specific terms have been employed, they have been used in a generic and descriptive sense only and not for purposes of limitation, the scope of the invention being set forth in the following claims.

That which is claimed is:

1. A clamping system for a fluid injection gun and cartridge such as the type in which one or more fluid foam precursors are fed to the gun and cartridge to be mixed and distributed to make custom foam packaging, said clamping system comprising:

a valve that defines respective opened and closed positions for controlling the flow of fluid to an injection cartridge;

a clamp seat adjacent said valve for receiving an injection cartridge therein;

a clamp lid engagable against said seat and movable between respective open and closed positions for maintaining a cartridge in said seat when said clamp lid is closed and for allowing a cartridge to be removed or replaced when said clamp lid is open;

means on said valve for preventing said clamp lid from being opened while said valve is open to thereby prevent said clamp lid from being opened when fluid is flowing through said valve; and means on said clamp lid for preventing said valve from being opened when said clamp lid is opened to thereby prevent the flow of fluid when said lid is open.

2. A clamping system according to claim 1 wherein said clamp seat further comprises a longitudinally positioned semicylindrical channel for receiving a cylindrical cartridge therein.

3. A clamping system according to claim 2 wherein said clamp seat further comprises a groove therein perpendicular to said semicylindrical channel for receiving a clip ring that is positioned around an injection cartridge to provide lateral support to a cartridge in said clamping system when lateral forces are applied against the cartridge.

4. A clamping system according to claim 2 wherein said clamp lid has a longitudinally positioned semicylindrical channel therein corresponding to said channel in said clamp seat for defining a longitudinal cylindrical opening between said seat and said lid for clamping a cylindrical cartridge therein.

5. A clamping system according to claim 4 wherein said clamp lid further comprises a groove therein perpendicular to said semicylindrical channel for receiving a clip ring that is positioned around an injection cartridge to provide lateral support to a cartridge in said clamping system when lateral forces are applied against the cartridge.

6. A clamping system according to claim 1 wherein said clamp lid is hinged to said clamp seat.

7. A clamping system according to claim 1 wherein said valve further comprises a rotatable valve stem for being rotated to open and close said valve and wherein said clamp lid opening prevention means comprises a finger on said valve stem that covers said clamp lid when said lid is closed and said valve is open so that said lid cannot be opened until said valve is closed.

8. A clamping system according to claim 7 wherein said valve opening prevention means comprises a shoulder on said clamp lid positioned in the path of rotation of said valve stem finger when said lid is opened for blocking rotation of said finger and of said valve to thereby prevent said valve from being rotated open when said lid is open.

9. A clamping system according to claim 8 and further comprising means for releasably securing said clamp lid in said closed position thereof.

10. A clamping system for a fluid injection gun and cartridge such as the type in which one or more fluid foam precursors are fed to the gun and cartridge to be mixed and distributed to make custom foam packaging, said clamping system comprising:

a clamp seat having a longitudinally positioned semicylindrical channel for receiving a cylindrical cartridge therein;

a pair of fluid valves mounted to said clamp seat on opposite sides of said semicylindrical channel, each said valve defining respective opened and closed positions for controlling the flow of a fluid to an injection cartridge in said clamp seat;

a clamp lid hinged to and engagable against said seat and movable between respective open and closed positions for maintaining a cartridge in said seat when said clamp lid is closed and for allowing a cartridge to be removed or replaced when said clamp lid is open, said clamp lid having a longitudinally positioned semicylindrical channel therein corresponding to said channel in said clamp seat when said clamp seat is in said closed position for defining a longitudinal cylindrical opening between said seat and said lid for clamping a cylindrical cartridge therein;

a rotatable valve stem on each of said valves for opening and closing said valve, and a finger on each said valve stem that covers said clamp lid when said lid is closed and said valve is open so that said lid cannot be opened until both of said valves are closed; and wherein said clamp lid is hinged in the path of rotation of said valve stem fingers when said lid is opened for blocking rotation of said fingers to thereby prevent said valves from being opened when said lid is open.

11. A clamping system according to claim 10 wherein the opened and closed positions of said valves are defined by rotating said valve stems 90 degrees.

12. A clamping system according to claim 10 wherein said clamp seat and said clamp lid each further comprise a groove therein perpendicular to said respective semicylindrical channels and corresponding to one another when said lid is engaged against said seat to define an annular groove perpendicular to said cylindrical opening for receiving a clip ring in said annular groove that is positioned around an injection cartridge to provide lateral support to a cartridge in said clamping system when lateral forces are applied against the cartridge.

13. A clamping system according to claim 10 wherein said lid further comprise a pair of openings on opposite sides of said semicylindrical channel for receiving a pair of clamping bolts therethrough.

14. A clamping system according to claim 13 wherein seat further comprises a pair of threaded openings therein corresponding to said openings in said lid for threadedly receiving a pair of respective clamping bolts therein.

15. A clamping system according to claim 10 wherein said clamp seat further comprises a respective fluid flow passage therein from each of said valves to said semicylindrical channel for providing a fluid flow path from each said valve to an injection cartridge in said channel.

16. A fluid injection apparatus such as the type in which one or more fluid foam precursors are fed to a gun and injection cartridge to be mixed and distributed to make custom foam packaging, said injection apparatus comprising:

a gun framework for supporting the operative elements of said injection apparatus;

a clamp seat carried by said gun framework and having a longitudinally positioned channel for receiving an injection cartridge therein;

a clamp lid hinged to and engagable against said seat and movable between respective open and closed positions for maintaining a cartridge in said seat when said clamp lid is closed and for allowing a cartridge to be removed or replaced when said clamp lid is open, said lid having a longitudinally positioned channel therein corresponding to said channel in said clamp seat for defining a longitudinal opening between said seat and said lid;

an injection cartridge in said longitudinal opening defined by said lid and said seat;

a pair of fluid valves mounted in said clamp seat on opposite sides of said channel, each said valve defining respective opened and closed positions for controlling the flow of a fluid to said injection cartridge;

a rotating valve stem on each of said valves for opening and closing said valve, and a finger on each said valve stem that covers said clamp lid when said lid is closed and said valve is open so that said lid cannot be opened until both of said valves are closed; and wherein said clamp lid is hinged in the path of rotation of said valve stem fingers when said lid is opened for blocking rotation of said fingers and of said valves to thereby prevent said valves from being rotated open when said lid is open.

17. A fluid injection apparatus according to claim 16 wherein said injection cartridge comprises a cylindrical cartridge and said respective channels in said clamp seat and said clamp lid are each semicylindrical and form a cylindrical opening when said lid is engaged against said seat.

18. A fluid injection apparatus according to claim 17 wherein said clamp seat and said clamp lid each further comprise a groove therein perpendicular to said respective semicylindrical channels and corresponding to one another when said lid is engaged against said seat to define an annular groove perpendicular to said cylindrical opening for receiving a clip ring in said annular groove that is positioned around said injection cartridge to provide lateral support to said cartridge in said clamping system when lateral forces are applied against said cartridge.

19. A fluid injection apparatus according to claim 18 wherein said injection cartridge further comprises a clip ring around said cartridge for being received in said annular groove in said cylindrical opening.

20. A fluid injection apparatus according to claim 16 and further comprising a pair of hinges between said clamp seat and said clamp lid and positioned adjacent rearward portions of said seat, said lid, and said cartridge;

said valve stem fingers being rotatable towards said rearward portions to close said valves; and each of said fingers having a length such that its radius of rotation brings it into contact with said lid adjacent said hinges when said lid is open to thereby prevent said fingers from being rotated when said lid is open to corresponding prevent said valves from being opened and fluid from flowing when said lid is open.

21. A fluid injection apparatus according to claim 16 wherein said clamp seat further comprises a respective fluid flow passage therein from each of said valves to said semicylindrical channel for providing a fluid flow path from each said valve to an injection cartridge in said channel, and said injection cartridge further comprises a pair of respective cooperating openings therein for permitting passage of fluids from said valves to said cartridge.

22. A clamping system for a fluid injection gun and cartridge such as the type in which one or more fluid foam precursors are fed to the gun and cartridge to be mixed and distributed to make custom foam packaging, said clamping system comprising:

a valve that defines respective opened and closed positions for controlling the flow of fluid to an injection cartridge;

a clamp seat adjacent said valve for receiving an injection cartridge therein;

a clamp lid engagable against said seat and movable between respective open and closed positions for maintaining a cartridge in said seat when said clamp lid is closed and for allowing a cartridge to be removed or replaced when said clamp lid is open; and means on said valve for preventing said clamp lid from being opened while said valve is open to thereby prevent said clamp lid from being opened when fluid is flowing through said valve.

23. A clamping system for a fluid injection gun and cartridge such as the type in which one or more fluid foam precursors are fed to the gun and cartridge to be mixed and distributed to make custom foam packaging, said clamping system comprising:

a valve that defines respective opened and closed positions for controlling the flow of fluid to an injection cartridge;

a clamp seat adjacent said valve for receiving an injection cartridge therein;

a clamp lid engagable against said seat and movable between respective open and closed positions for maintaining a cartridge in said seat when said clamp lid is closed and for allowing a cartridge to be removed or replaced when said clamp lid is open; and means on said clamp lid for preventing said valve from being opened when said clamp lid is opened to thereby prevent the flow of fluid when said lid is open.

* * * * *

UNITED STATES PATENT AND TRADEMARK OFFICE
CERTIFICATE OF CORRECTION

PATENT NO. : 5,215,226
DATED : June 1, 1993
INVENTOR(S) : Bertram, et al.

It is certified that error appears in the above-identified patent and that said Letters Patent is hereby corrected as shown below:

In Column 2, line 8, add closing quotation mark after the "s" in Precursors

In Column 2, line 11, add closing quotation mark after the "s" in Cartridges

In Column 2, line 40, "describe" should be -- described --

In Column 5, line 51, "he" should be -- the --

In Column 6, line 9, "Which" should be -- which --

In Column 6, line 46, "prevent" should be -- present --

Signed and Sealed this

Twenty-fifth Day of January, 1994

Attest:

BRUCE LEHMAN

*Attesting Officer*     *Commissioner of Patents and Trademarks*